United States Patent

Krause

[15] 3,637,936

[45] Jan. 25, 1972

[54] AUTOMATIC FINE TIME-CORRECTING CIRCUIT FOR TIME CORRECTING THE OUTPUT OF A COARSE TIME CORRECTOR IN A COLOR TV SYSTEM

[72] Inventor: Gerhard Krause, Darmstadt, Germany

[73] Assignee: Fernseh GmbH, Darmstadt, Germany

[22] Filed: Apr. 7, 1969

[21] Appl. No.: 813,865

[30] Foreign Application Priority Data

Apr. 13, 1968 Germany ......................P 17 62 131.7

[52] U.S. Cl. ................178/69.5 CB, 178/5.2 R, 178/5.4 CD

[51] Int. Cl. ..........................................................H04n 9/46

[58] Field of Search ........178/5.4 CD, 5.4 R, 6.6 A, 69.5 CB, 178/5.2 R

[56] References Cited

UNITED STATES PATENTS

| | | | |
|---|---|---|---|
| 3,225,134 | 12/1965 | Jensen | 178/5.4 |
| 3,312,780 | 4/1967 | Hurst et al. | 178/5.4 |

*Primary Examiner*—Richard Murray
*Assistant Examiner*—P. M. Pecori
*Attorney*—Ernest F. Marmorek

[57] ABSTRACT

An automatic fine time-correcting circuit coupled to the output of the coarse time corrector in which the reference signal used in the phase comparator circuit is taken off a color carrier regenerator circuit, and the output of the fine time corrector is fed back to the coarse corrector circuit through a threshold device including a pair of antiparallel connected diodes.

5 Claims, 1 Drawing Figure

PATENTED JAN 25 1972
3,637,936
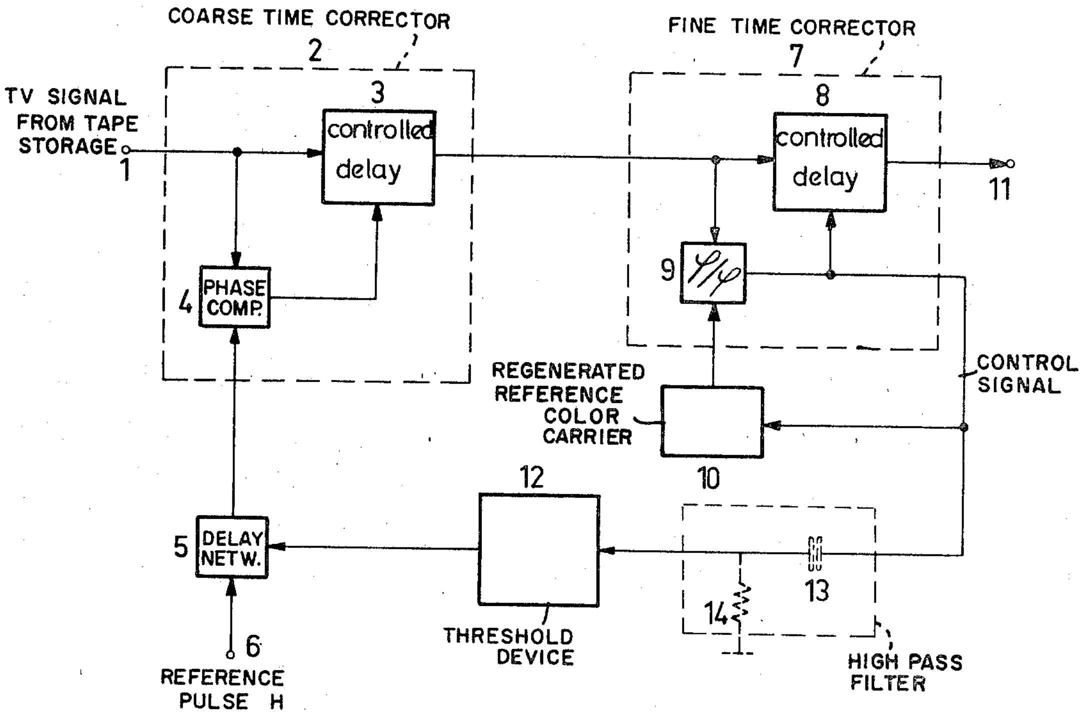
Inventor :
Gerhard Krause
by [signature]
His Attorney.

AUTOMATIC FINE TIME-CORRECTING CIRCUIT FOR TIME CORRECTING THE OUTPUT OF A COARSE TIME CORRECTOR IN A COLOR TV SYSTEM

The present invention relates to a circuit arrangement for fine correcting the time errors subsequent to a coarse time corrector circuit in a color TV system, and in which the color TV signals are taken off a storage device such as a magnetic storage tape.

In a known time-correcting arrangement of color TV signals taken off a storage device, two time-correcting circuits are arranged in the path of the color TV signal. In the first time-correcting circuit, the so-called coarse time-correcting circuit, the horizontal synchronizing pulse of the color TV signal is compared in its phase with a reference pulse corresponding to the horizontal frequency. The delay time of a controlled transit-time-type delay network is adjusted so that the phase of the color TV signal deviates very little from the desired phase value.

In the second time-correcting circuit, the so-called fine or color automatic time-correcting circuit, the color burst of the color TV signal is compared with a reference color carrier and the delay time of a further controlled transit-time-type delay network is adjusted in such a manner that the phase difference of the color burst signals with respect to a desired phase value is very small.

Inasmuch as the control range of the fine time-correcting circuit is limited by the phase-comparing process of the relatively high-frequency color burst signal with that of the reference color carrier, and furthermore, in view of the fact that there is no stable phase coupling between the color carrier and the horizontal sync pulse, it may happen that the control range of the fine automatic time-correcting circuit becomes insufficient in order to compensate for the remaining time errors of the coarse time-correcting circuit.

In another known circuit arrangement, the above shortcomings have been eliminated in that the control voltage of the fine time-correcting circuit is returned or fed back into the coarse time-correcting circuit. As a result, the remaining time errors of the coarse time-correcting circuit with respect to the color burst are reduced. As a result of such coupling between the two control circuits, they still remain in an indifferent state instead of a stable state even when a regenerated color reference carrier is used. This means that it cannot be positively ascertained which portion of the total time error is corrected by one or the other time-correcting circuits. This shortcoming becomes apparent when the color TV signals are reproduced and it is particularly demonstrated by a shifting of the picture over the screen within irregular time intervals.

It is, therefore, among the principal objects of the present invention to eliminate the above-described shortcomings of the known fine or automatic time-correcting circuits in a color TV system.

The invention provides for a fine time-correcting circuit for a color TV system which is connected for additionally correcting the output of a coarse time-correcting circuit in a television system in which the color TV signals are taken off a magnetic storage device, such as a magnetic tape; the coarse time-correcting circuit includes a phase comparator circuit in which the output of the fine time-correcting circuit in the form of a control voltage is compared in its phase with a reference pulse having a frequency corresponding to the horizontal frequency; thereby the coarse time-correcting circuit is further improved; the fine time-correcting circuit comprises also a phase comparator circuit in which the output of the coarse time-correcting circuit is compared with a reference pulse which is produced by a color carrier regenerator and, the output of which phase comparator circuit is fed back to the first-mentioned phase comparator circuit through a threshold device.

The advantage of the time-correcting arrangement according to the invention resides in that the quick feedback over the coarse time-correcting circuit will not cause the control voltage to go to zero before the color carrier regenerator could adjust itself properly. The presence of the threshold device prevents the control voltage from becoming zero after correcting the coarse time-correcting circuit and, as a result, it makes it possible that a color carrier regenerator can be used.

Furthermore, according to the invention, the control voltage passes through a high-pass filter before it reaches the threshold device. As a result, the delay time of the coarse time-correcting circuit is influenced only by changes in the control voltage so that the mean value of its delay time is determined solely by the phase of the horizontal sync pulse with respect to the phase of a reference pulse having a frequency same as the horizontal frequency.

According to the invention, the threshold device in its simple preferred embodiment comprises a pair of semiconductor diodes connected in antiparallel relationship with each other.

The invention will become more readily apparent from the following description thereof, shown by way of example, in the accompanying drawing in which:

The single FIGURE is a block diagram of the time-correcting arrangement in accordance with the invention.

With reference to the drawing, it is seen that the color TV signal FBAS enters the time-correcting circuit arrangement at input 1 and it is received first in the coarse time-correcting circuit 2. The latter comprises in its illustrative embodiment shown in the drawing a controlled transit-time-type delay network 3 and a phase comparator circuit 4. The coarse time-correcting circuit 2 can, however, be designed in any known manner.

At a terminal 6, a reference pulse H is fed into the circuit arrangement which through a controlled delay network 5 enters a phase comparator circuit 4. As a result of the phase comparison between the horizontal synchronizing pulse of the color TV signal and the delayed reference pulse H having the horizontal frequency, a control voltage is produced which is fed into the controlled delay network 3 to effect its delay time.

From the controlled transit-time-type delay network 3, the color TV signal enters the fine automatic color time-correcting circuit 7 which comprises a controlled transit-time-type delay network 8 and a phase comparator circuit 9. A color carrier regenerator 10 produces a color carrier which is used to compare its phase with the phase of the color burst of the color TV signal coming from the coarse time-correcting circuit 2 and entering the phase comparator circuit 9.

The control voltage produced as a result of the phase-comparing process is fed into the controlled transit time-type delay network 8 and back into the color carrier regenerator 10. This control voltage is further fed to the input of a transducer device 12 which is a device having threshold characteristics. As mentioned above, the transducer 12 in its preferred embodiment comprises a pair of semiconductor diodes coupled in antiparallel circuit relationship with each other.

In the event that the control voltage coming from the phase comparator circuit 9 exceeds the threshold value of the transducer 12 due to larger phase differences between the color burst and the color carrier, then the controlled delay network 5 is effected in a manner that the phase error of the color burst of the color TV signal coming from the coarse time-correcting circuit 2 will be reduced. The characteristics of the controlled delay network 5 are approximately integral characteristics so that the adjusted state of the controlled transit-time-type delay network 3, as a result of the excess value over the threshold device, will be retained even after the control voltage has gone back below the threshold value of the transducer 12.

In the event that the control voltage is within the threshold value of the transducer 12, then it has no effect on the delay time of the coarse time-correcting circuit 2.

In some cases it is desirable that in the path of the control voltage, before it reaches the device 12, a high-pass filter comprising a capacitor 13 and a resistor 14 be inserted.

While the invention has been described in connection with only one specific embodiment, it will be readily apparent that numerous modifications thereof may be readily made. It is, therefore, intended by the appended claims to cover all such modifications and variations as come within the true spirit and scope of the invention.

I claim:

1. A circuit arrangement, for fine time correcting the output of a coarse time-correcting circuit in a color TV system, comprising a delay network for receiving the coarse time corrected TV signal, a phase comparator circuit operable for receiving the color-synchronizing portion of said coarse corrected TV signal and comparing said signal portion with a reference signal to produce a control signal for finely correcting said coarse time-corrected TV signal, for regenerating said reference signal, and for readjusting said coarse time-correcting circuit, means coupled to said comparator circuit for producing said reference signal in the form of a regenerated color carrier, and a threshold device connected in series with a feedback path between the output of said comparator circuit and said coarse time-correcting circuit to readjust said coarse time-correcting circuit by a portion of said control signal exceeding a threshold of said threshold device, thereby preventing said control signal from dropping to zero after the readjustment of said coarse time-correcting circuit.

2. The circuit arrangement, as claimed in claim 1, wherein said threshold device comprises a pair of oppositely poled parallel connected semiconductor unidirectional devices.

3. The circuit arrangement, as claimed in claim 2, wherein said unidirectional devices are diodes.

4. The circuit arrangement as claimed in claim 1, wherein a high-pass filter is connected between the output of said phase comparator circuit and said threshold device.

5. The circuit arrangement, as claimed in claim 1, wherein said color TV signal is received from a magnetic storage device such as a magnetic tape.

* * * * *